(12) United States Patent
Lee

(10) Patent No.: US 11,852,468 B2
(45) Date of Patent: Dec. 26, 2023

(54) MEASURING DEVICE

(71) Applicant: Altonia Lee, Carson, CA (US)

(72) Inventor: Altonia Lee, Carson, CA (US)

( * ) Notice: Subject to any disclaimer, the term of this patent is extended or adjusted under 35 U.S.C. 154(b) by 58 days.

(21) Appl. No.: 17/545,037

(22) Filed: Dec. 8, 2021

(65) Prior Publication Data

US 2023/0175827 A1 Jun. 8, 2023

(51) Int. Cl.
*G01B 3/10* (2020.01)
*G01B 3/1061* (2020.01)
*G01B 3/1003* (2020.01)
*G01C 9/06* (2006.01)

(52) U.S. Cl.
CPC ......... *G01B 3/1061* (2013.01); *G01B 3/1003* (2020.01); *G01C 9/06* (2013.01); *G01C 2009/066* (2013.01)

(58) Field of Classification Search
CPC ... G01B 3/1061; G01B 3/1003; G01B 3/1087
USPC .......................................................... 33/771
See application file for complete search history.

(56) References Cited

U.S. PATENT DOCUMENTS

| | | | |
|---|---|---|---|
| 3,648,835 A | 3/1972 | Yucel | |
| 4,024,831 A | 5/1977 | Sperling | |
| 4,462,160 A * | 7/1984 | Cohen | G01B 3/1005 33/760 |
| 5,426,863 A * | 6/1995 | Biggel | G01B 3/1061 33/763 |
| 5,433,014 A * | 7/1995 | Falk | G01D 5/347 455/67.11 |
| D522,889 S | 6/2006 | Wallace | |
| 7,860,673 B2 | 12/2010 | Harel | |
| 9,816,795 B2 * | 11/2017 | Bitton | G01B 3/1084 |
| 11,060,834 B1 * | 7/2021 | Luck | G01B 3/1061 |
| 2005/0257393 A1 | 11/2005 | Spanski | |
| 2006/0096112 A1 | 5/2006 | Berring | |
| 2020/0106998 A1 * | 4/2020 | Staton | G01B 3/1061 |

* cited by examiner

*Primary Examiner* — George B Bennett

(57) ABSTRACT

A measuring device for use with a laser level includes a measuring tape. A section of the measuring tape is substantially transparent and thus allows passage of a laser beam that is emitted by a laser level. Indicia of the measuring tape indicate a distance of the laser beam from a terminus of the measuring tape.

15 Claims, 4 Drawing Sheets

MEASURING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to measuring devices and more particularly pertains to a new measuring device for use with a laser level. The present invention discloses a measuring device comprising a self-retracting metal tape measure having a transparent section.

(2) Description of Related Art Including Information Disclosed Under 37 CFR 1.97 and 1.98.

The prior art relates to measuring devices. Prior art measuring devices may comprise transparent rulers, transparent adhesive tapes, and transparent measuring tapes. What is lacking in the prior art is a measuring device comprising a self-retracting metal tape measure having a transparent section.

BRIEF SUMMARY OF THE INVENTION

An embodiment of the disclosure meets the needs presented above by generally comprising a measuring tape. A section of the measuring tape is substantially transparent and thus is configured for passing of a laser beam that is emitted by a laser level. Indicia of the measuring tape are configured to indicate a distance of the laser beam from a terminus of the measuring tape.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
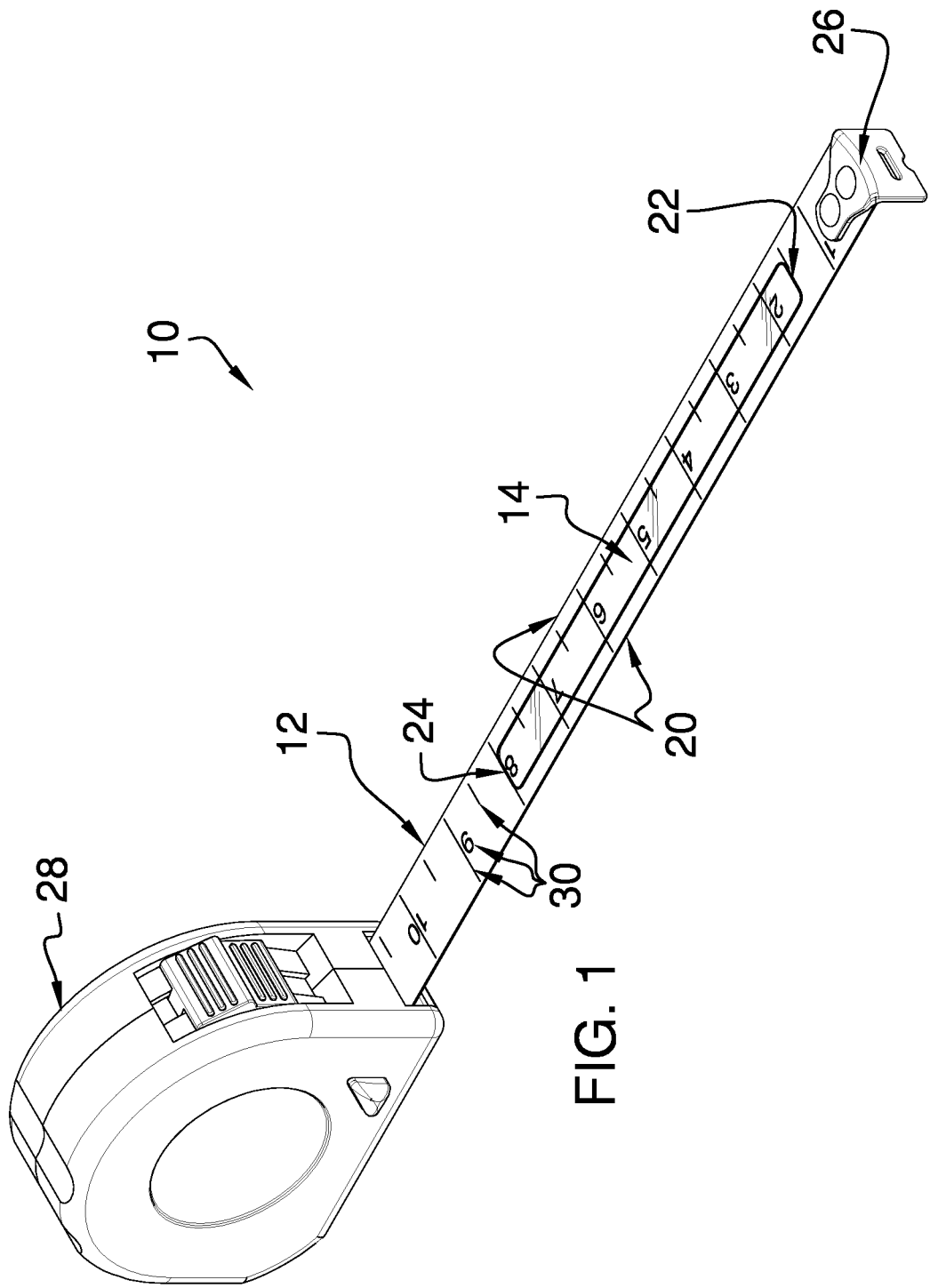
FIG. 1 is an isometric perspective view of a measuring device according to an embodiment of the disclosure.

With reference now to the drawings, and in particular to FIGS. 1 through 4 thereof, a new measuring device embodying the principles and concepts of an embodiment of the disclosure and generally designated by the reference numeral 10 will be described.

Figure 2:
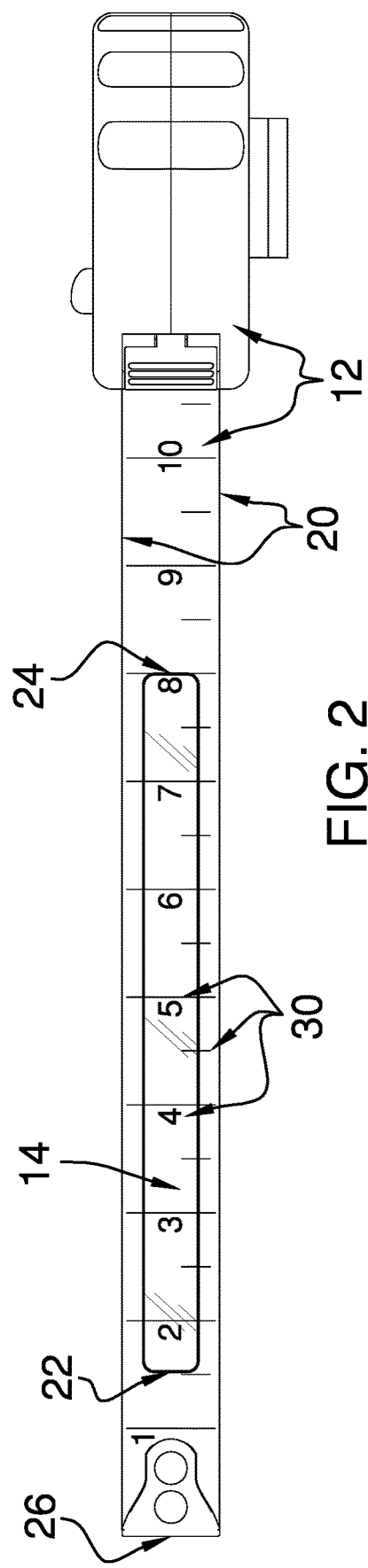
FIG. 2 is a top view of an embodiment of the disclosure.

As best illustrated in FIGS. 1 through 4, the measuring device 10 generally comprises a measuring tape 12. A section 14 of the measuring tape 12 is substantially transparent and thus is configured to allow passage of a laser beam 16 that is emitted by a laser level 18. The section 14 extends from proximate to opposed edges 20 of the measuring tape 12. A first end 22 and a second end 24 of the section 14 are separated by from 1.0 cm to 760.0 cm. The first end 22 and the second end 24 of the section 14 may be separated by from 2.0 cm to 250.0 cm. As shown in FIG. 2, the first end 22 of the section 14 may be approximately 3.8 cm from a terminus 26 of the measuring tape 12 and the second end 24 of the section 14 may be approximately 20.3 cm from the terminus 26. The measuring tape 12 comprises a self-retracting metal tape measure 28.

Figure 3:
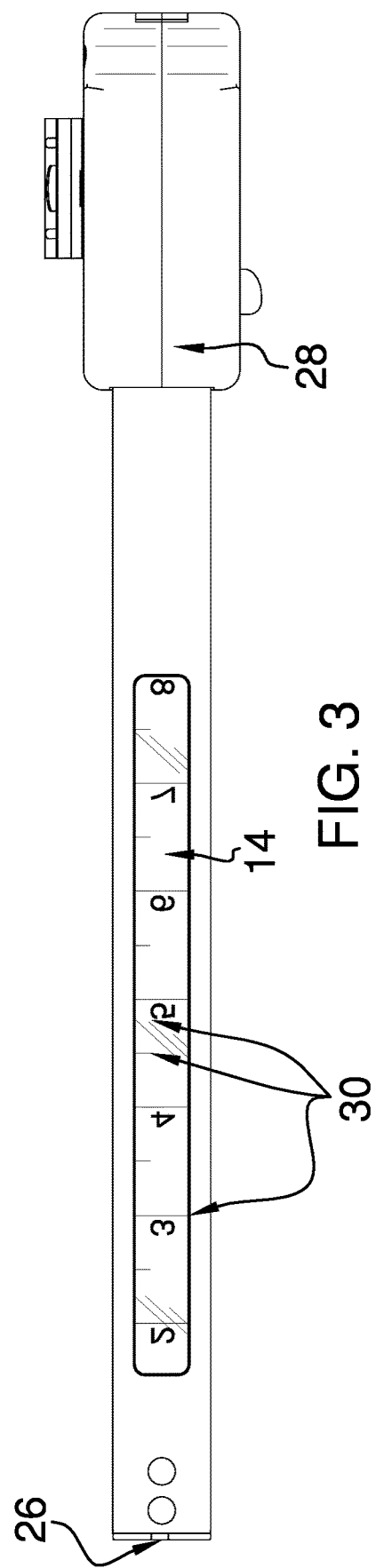
FIG. 3 is a bottom view of an embodiment of the disclosure.
Figure 4:
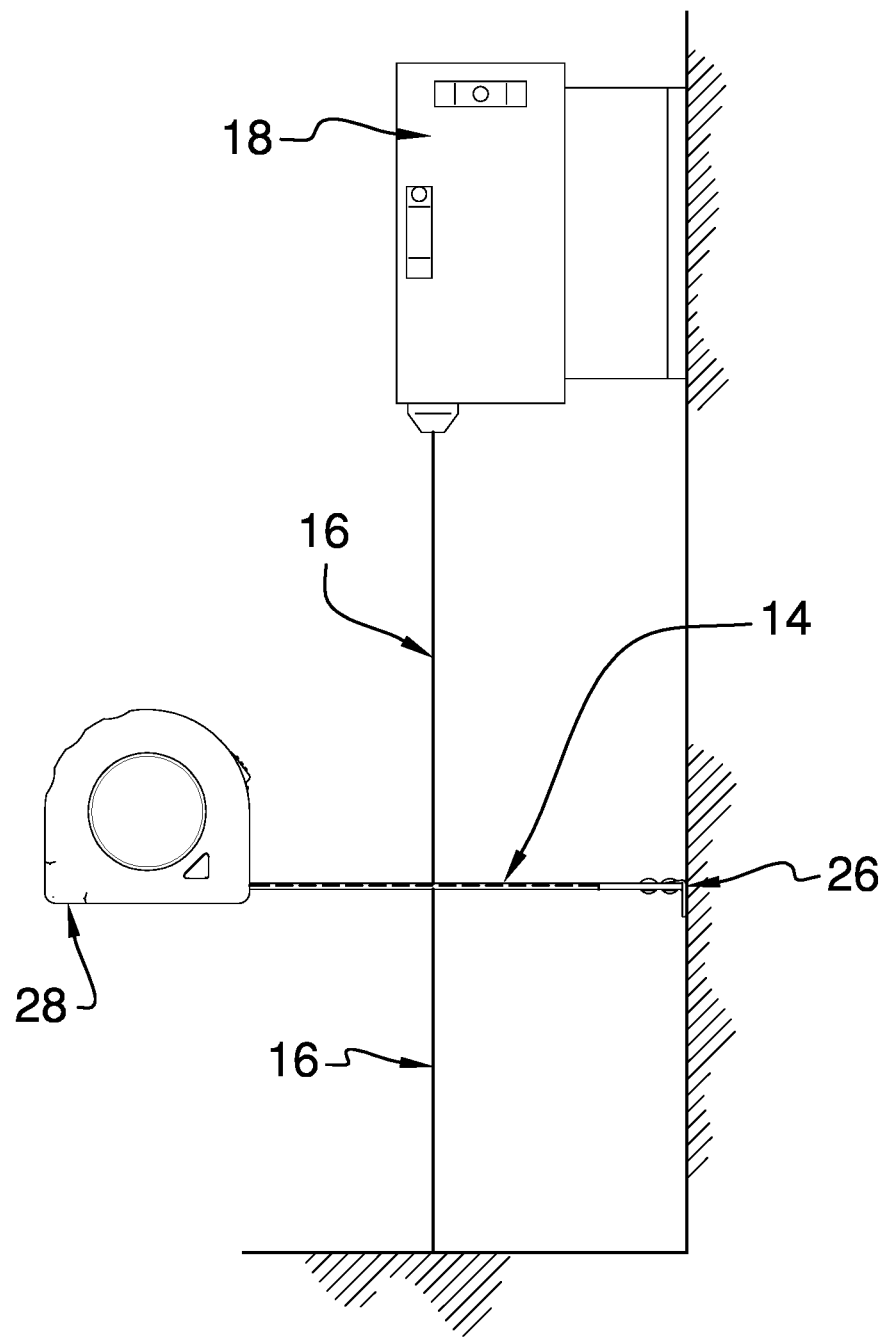
FIG. 4 is an in-use view of an embodiment of the disclosure.

Indicia 30 of the measuring tape 12 are configured to indicate a distance of the laser beam 16 from the terminus 26 of the measuring tape 12. Respective indicia 30 are positioned on the section 14, extend into the section 14, and extend across the section 14 so that the respective indicia 30 are viewable from above or below the measuring tape 12, as shown in FIGS. 2 and 3, respectively.

In use, the measuring tape 12 is used with a laser level 18. The laser level 18 is positioned on a substrate and emits a vertical laser beam 16. The measuring tape 12 is used to measure a distance between the substrate and the laser beam 16 at several points distal from the laser level 18 to assess whether the substate is plumb. Similarly, the measuring tape 12 and the laser level 18 can be used to determine level of a substate using a horizontal laser beam 16 emitted by the laser level 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A measuring device comprising:
    a measuring tape, a section of the measuring tape being substantially transparent, wherein the section is configured for passing of a laser beam emitted by a laser level, and wherein indicia of the measuring tape are configured for indicating a distance of the laser beam from a terminus of the measuring tape; and
    wherein at least a portion of the indicia is positioned on the section such that the portion of the indicia positioned on the section is viewable from above or below the measuring tape.

2. The measuring device of claim 1, wherein the section extends from proximate to opposed edges of the measuring tape.

3. The measuring device of claim 1, wherein a first end and a second end of the section are separated by from 1.0 cm to 760.0 cm.

4. The measuring device of claim 3, wherein the first end and the second end of the section are separated by from 2.0 cm to 250.0 cm.

5. The measuring device of claim 4, wherein:
    the first end of the section is approximately 3.8 cm from the terminus of the measuring tape; and
    the second end of the section is approximately 20.3 cm from the minus.

6. The measuring device of claim 1, wherein the measuring tape comprises a self-retracting metal tape measure.

7. The measuring device of claim 1, wherein respective indicia of the indicia of the measuring tape:
    are positioned fully on the section;
    extend into the section from outside the section; and
    extend fully across the section.

8. A measuring system comprising:
    a laser level; and
    a measuring tape, a section of the measuring tape being substantially transparent, such that a laser beam emitted by the laser level passes through the section, wherein indicia of the measuring tape are configured for indicating a distance of the laser beam from a terminus of the measuring tape; and
    wherein at least a portion of the indicia is positioned on the section such that the portion of the indicia positioned on the section is viewable from above or below the measuring tape.

9. The measuring system of claim 8, wherein the section extends from proximate to opposed edges of the measuring tape.

10. The measuring system of claim 8, wherein a first end and a second end of the section are separated by from 1.0 cm to 760.0 cm.

11. The measuring system of claim 10, wherein the first end and the second end of the section are separated by from 2.0 cm to 250.0 cm.

12. The measuring system of claim 11, Wherein:
    the first end of the section is approximately 3.8 cm from the terminus of the measuring tape; and
    the second end of the section is approximately 20.3 cm from the terminus.

13. The measuring system of claim 8, wherein the measuring tape comprises a self-retracting metal tape measure.

14. The measuring system of claim 8, wherein respective indicia of the indicia of the measuring tape:
    are positioned fully on the section;
    extend into the section from outside the section; and
    extend fully across the section.

15. A measuring device comprising:
    a measuring tape, a section of the measuring tape being substantially transparent, wherein the section is configured for passing of a laser beam emitted by a laser level, and wherein indicia of the measuring tape are configured for indicating a distance of the laser beam from a terminus of the measuring tape, the section extending from proximate to opposed edges of the measuring tape, a first end of the section being approximately 3.8 cm from a terminus of the measuring tape, a second end of the section being approximately 20.3 cm from the terminus, the measuring tape comprising a self retracting metal tape measure;
    wherein at least a portion of the indicia is positioned on the section such that the portion of the indicia positioned on the section is viewable from above or below the measuring tape; and
    wherein respective indicia of the indicia of the measuring tape:
    are positioned fully on the section;
    extend into the section from outside the section; and
    extend fully across the section.

* * * * *